(12) United States Patent
Ko (10) Patent No.: US 8,829,834 B2
(45) Date of Patent: Sep. 9, 2014

(54) MOTOR DRIVING CONTROL APPARATUS AND METHOD, AND MOTOR USING THE SAME

(71) Applicant: Samsung Electro-Mechanics Co., Ltd., Gyunggi-do (KR)

(72) Inventor: Joo Yul Ko, Gyunggi-do (KR)

(73) Assignee: Samsung Electro-Mechanics Co., Ltd., Suwon, Gyunggi-Do (KR)

(*) Notice: Subject to any disclaimer, the term of this patent is extended or adjusted under 35 U.S.C. 154(b) by 0 days.

(21) Appl. No.: 13/770,973

(22) Filed: Feb. 19, 2013

(65) Prior Publication Data
US 2014/0152211 A1 Jun. 5, 2014

(30) Foreign Application Priority Data
Nov. 30, 2012 (KR) .................. 10-2012-0138427

(51) Int. Cl.
*H02P 6/04* (2006.01)
*H03K 5/00* (2006.01)
*H02P 6/16* (2006.01)

(52) U.S. Cl.
USPC ............ 318/400.11; 318/400.13; 318/400.04; 318/400.2; 318/400.35

(58) Field of Classification Search
USPC ............... 318/400.11, 400.13, 400.04, 400.2, 318/400.35
See application file for complete search history.

(56) References Cited

U.S. PATENT DOCUMENTS

| | | | | |
|---|---|---|---|---|
| 3,710,701 A | * | 1/1973 | Takishima et al. | 396/61 |
| 4,008,426 A | * | 2/1977 | Ogura | 388/824 |
| 8,294,400 B2 | * | 10/2012 | Harmer | 318/400.34 |
| 2001/0026414 A1 | * | 10/2001 | Shibata | 360/75 |
| 2006/0066980 A1 | | 3/2006 | Brenden et al. | |
| 2007/0001632 A1 | * | 1/2007 | Daio | 318/254 |
| 2010/0148710 A1 | | 6/2010 | Lim et al. | |
| 2010/0295489 A1 | | 11/2010 | Sano et al. | |
| 2011/0156622 A1 | * | 6/2011 | Galbiati | 318/400.2 |
| 2012/0055732 A1 | | 3/2012 | Komatsu et al. | |

FOREIGN PATENT DOCUMENTS

| | | |
|---|---|---|
| JP | 09261993 | 10/1997 |
| JP | 10271878 | 10/1998 |
| JP | 2000-287480 A | 10/2000 |
| JP | 3416494 B2 | 6/2003 |

(Continued)

OTHER PUBLICATIONS

Korean Office Action issued in Application No. 10-2012-0138427 dated Oct. 24, 2013.

(Continued)

*Primary Examiner* — Paul Ip
*Assistant Examiner* — Gabriel Agared
(74) *Attorney, Agent, or Firm* — McDermott Will & Emery LLP (57) ABSTRACT

There are provided a motor driving control apparatus and method, and a motor using the same. The motor driving control apparatus includes: an inverter unit applying a driving current to a motor apparatus according to a driving control signal; a back-electromotive force detecting unit detecting back-electromotive force generated by driving of the motor apparatus; a driving current change unit reflecting a level of the back-electromotive force to determine a resistance value and reflecting the resistance value in the driving current; and a controlling unit performing a control operation to change the driving control signal using the driving current in which the resistance value is reflected and the back-electromotive force.

14 Claims, 5 Drawing Sheets

(56) References Cited

FOREIGN PATENT DOCUMENTS

| JP | 2007-290669 A | 11/2007 |
|---|---|---|
| JP | 2009-122520 | 5/2009 |
| JP | 2009-194974 A | 8/2009 |
| JP | 2009-231737 A | 10/2009 |
| JP | 2009-268287 A | 11/2009 |
| JP | 2010-104219 A | 5/2010 |
| JP | 2012-76733 A | 4/2012 |
| KR | 2010-0070222 A | 6/2010 |

OTHER PUBLICATIONS

Japanese Office Action issued in Application No. 2013-029207 dated Dec. 24, 2013.

* cited by examiner

MOTOR DRIVING CONTROL APPARATUS AND METHOD, AND MOTOR USING THE SAME

CROSS-REFERENCE TO RELATED APPLICATIONS

This application claims the priority of Korean Patent Application No. 10-2012-0138427 filed on Nov. 30, 2012, in the Korean Intellectual Property Office, the disclosure of which is incorporated herein by reference.

BACKGROUND OF THE INVENTION

1. Field of the Invention

The present invention relates to a motor driving control apparatus and method capable of compensating for excessive driving current at the time of initial driving by reflecting a variable resistance component in driving current according to a range of back-electromotive force, and a motor using the same.

2. Description of the Related Art

In accordance with the development of motor technology, motors having various sizes have been used in a wide range of technological fields.

Generally, a motor is driven by allowing a rotor to be rotated by a permanent magnet and a coil having polarities changed according to current applied thereto. Initially, a brush type motor in which a coil is provided as a rotor was provided. However, this brush type motor has a problem such as brush abrasion, spark generation, and the like, during the driving of the motor.

Therefore, recently, various types of brushless motors have been in general use. A brushless motor, a direct current (DC) motor driven using an electronic rectifying element instead of a mechanical contact element such as a brush, a commutator, or the like, may include a stator configured of a permanent magnet and a rotor including a three-phase coil or a four-phase coil and rotated according to phase voltages in respective coils.

In order for the brushless motor to be efficiently driven, commutation of the respective phases (coils) of the rotor should be performed at an appropriate point. In addition, in order to perform appropriate commutation, a position of the rotor should be recognized.

To this end, a scheme of detecting a position of a rotor using an element such as a hall sensor, a resolver, or the like, has been used. However, in this case, there is a limitation in that a driving circuit may become relatively complicated.

In order to address this limitation, a technology of detecting a position of a phase using back-electromotive force (BEMF) instead of a sensor to drive a brushless motor has been widely used.

However, in the case of the scheme of using back-electromotive force, a problem regarding a current is present at the time of initial driving of the motor. That is, at the time of the initial driving of the motor, rotation of the motor may be insufficient, such that sufficient back-electromotive force may not be generated. As a result, excessive driving current may be generated.

In addition, since the motor is controlled using the excessively generated driving current, an error in driving control, or the like, may be generated.

The following Related Art Documents, which relate to a motor as described above, do not disclose a technology of overcoming a problem caused due to overcurrent generated at the time of initial driving of the motor.

RELATED ART DOCUMENT (Patent Document 1) Korean Patent Laid-Open Publication No. 2010-0070222
(Patent Document 2) US Patent Laid-Open Publication No. 2006-0066980

SUMMARY OF THE INVENTION

An aspect of the present invention provides a motor driving control apparatus and method capable of compensating for excessive driving current at the time of initial driving of the motor by reflecting a variable resistance component in driving current according to a range of back-electromotive force, and a motor using the same.

According to an aspect of the present invention, there is provided a motor driving control apparatus including: an inverter unit applying a driving current to a motor apparatus according to a driving control signal; a back-electromotive force detecting unit detecting back-electromotive force generated by driving of the motor apparatus; a driving current change unit reflecting a level of the back-electromotive force to determine a resistance value and reflecting the resistance value in the driving current; and a controlling unit performing a control operation to change the driving control signal using the driving current in which the resistance value is reflected and the back-electromotive force.

The driving current change unit may include a plurality of resistors connected to one another in series and open/close at least a portion of the plurality of resistors to reflect the resistance value in the driving current.

The driving current change unit may include a change controller receiving the back-electromotive force from the back-electromotive force detecting unit and determining the resistance value to be in inverse proportion to the level of the back-electromotive force.

The driving current change unit may pre-store information on a plurality of predetermined differential resistance values according to a range of levels of the back-electromotive force and determine a resistance value corresponding to the range of levels of the back-electromotive force input from the back-electromotive force detecting unit using the information.

The driving current change unit may further include a variable resistor including a plurality of resistors connected to one another in series and operated to switch at least a portion of the plurality of resistors connected to one another in series according to a control signal of the change controller to have the resistance value.

The plurality of resistors connected to one another in series may be configured in a ladder structure in which the plurality of resistors are connected to a plurality of switches in parallel, respectively.

The controlling unit may adjust a duty ratio of the driving control signal provided to the inverter unit according to the driving current in which the resistance value is reflected.

The controlling unit may control the driving signal generating unit to perform phase commutation at a zero-crossing point of the back-electromotive force.

The controlling unit may determine a phase commutation point of the motor apparatus using the back-electromotive force and controls generation of the driving control signal using the determined phase commutation point.

According to another aspect of the present invention, there is provided a motor including: a motor apparatus including a plurality of coils; and a motor driving control apparatus controlling current provided to the plurality of coils to control driving of the motor apparatus, wherein the motor driving control apparatus includes: an inverter unit applying a driving current to the motor apparatus according to a driving control signal; a back-electromotive force detecting unit detecting back-electromotive force generated by the driving of the motor apparatus; a driving current change unit reflecting a level of the back-electromotive force to determine a resistance value and reflecting the resistance value in the driving current; and a controlling unit performing a control operation to change the driving control signal using the driving current in which the resistance value is reflected and the back-electromotive force.

According to another aspect of the present invention, there is provided a motor driving control method performed by a motor driving control apparatus controlling driving of a motor apparatus, the motor driving control method including: detecting back-electromotive force generated by initial driving of the motor apparatus; comparing a level of the back-electromotive force with a preset value and determining a resistance value in inverse proportion to the level of the back-electromotive force when the level of the back-electromotive force is equal to or less than the preset value; and reflecting the resistance value in the driving current of the motor apparatus and limiting an increase in the driving current at the time of the initial driving of the motor apparatus.

The determining of the resistance value may include storing information on the resistance value preset according to a range of levels of the back-electromotive force.

The motor driving control apparatus may include a variable resistor having a ladder structure in which a plurality of resistors connected to each other in series are connected in parallel to a plurality of switches, respectively.

The determining of the resistance value may include generating a resistor control signal for switching at least a portion of the plurality of resistors connected to each other in series to correspond to the resistance value.

The limiting of the increase in the driving current may include switching at least a portion of the plurality of resistors connected to each other in series according to the resistor control signal to reflect the resistance value in the driving current.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same reference numerals will be used to designate the same or like components.

Hereinafter, for convenience of explanation, the present invention will be described based on a brushless motor. However, it is obvious that the scope of the present invention is not necessarily limited to the brushless motor.

In addition, hereinafter, a motor itself will be referred to as a motor apparatus 200, and an apparatus including the motor apparatus 200 and a motor driving control apparatus 100 for driving the motor apparatus 200 will be referred to as a motor.

Figure 1:
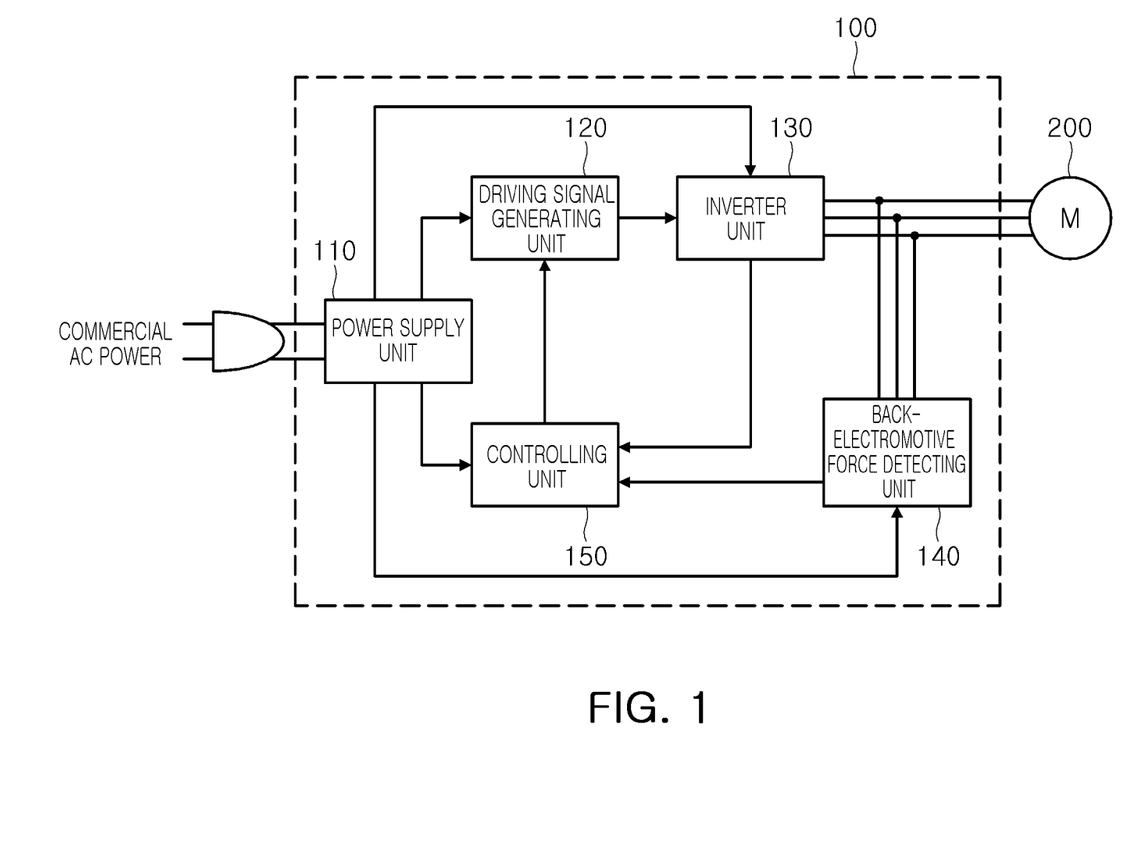
FIG. 1 is a configuration diagram illustrating an example of a motor driving control apparatus.

FIG. 1 is a configuration diagram illustrating an example of a motor driving control apparatus.

Referring to FIG. 1, the motor driving control apparatus 100 may include a power supply unit 110, a driving signal generating unit 120, an inverter unit 130, a back-electromotive force detecting unit 140, and a controlling unit 150.

The power supply unit 110 may supply power to respective components of the motor driving control apparatus 100. For example, the power supply unit 110 may convert commercial alternating current (AC) voltage into direct current (DC) voltage and supply the DC voltage to the respective components.

The driving signal generating unit 120 may provide a driving control signal to the inverter unit 130. For example, the driving control signal may be a pulse width modulation (PWM) signal.

The inverter unit 130 may control an operation of the motor apparatus 200. For example, the inverter unit 130 may convert the DC voltage into a multi-phase (for example, a three-phase or a four-phase) voltage according to the driving control signal and apply the multi-phase voltage to respective coils (not shown) of the motor apparatus 200.

The back-electromotive force detecting unit 140 may detect back-electromotive force in the motor apparatus 200. In the case in which the motor apparatus 200 is rotated, back-electromotive force is generated in the coils provided in a rotor of the motor apparatus 200. More specifically, back-electromotive force is generated in coils, among a plurality of coils, to which the phase voltage is not applied, and the back-electromotive force detecting unit 140 may detect the back-electromotive force generated in the respective coils of the motor apparatus 200 and provide the detected back-electromotive force to the controlling unit 150.

The controlling unit 150 may control the driving signal generating unit 120 to generate the driving control signal using the back-electromotive force provided from the back-electromotive force detecting unit 140. For example, the controlling unit 150 may control the driving signal generating unit 120 to perform phase commutation at a zero-crossing point of the back-electromotive force.

The motor apparatus 200 may perform a rotation operation according to the driving control signal. For example, the motor apparatus 200 may generate magnetic fields in the respective coils (stator) of the motor apparatus 200 by currents provided by the inverter unit 130 and flowing in the respective phases. The rotor (not shown) included in the motor apparatus 200 may be rotated by the magnetic fields generated in the respective coils as described above.

However, in the case of the motor driving control apparatus shown in FIG. 1, excessive driving current may be generated at the time of initial driving.

$$I = \frac{Vdc}{resistance} + \frac{1}{L}\int Vdc - BEMF \quad \text{[Equation 1]}$$

In Equation 1, an equation for current of the motor, resistance refers to a resistance component, and BEMF refers to back-electromotive force.

Here, since a level of back-electromotive force is in proportion to revolutions per minute (RPM) of the motor, the back-electromotive force at the time of initial driving of the motor apparatus 200 may have a low value.

Therefore, in the case in which a voltage Vdc and a resistance value resistance are constant, since the back-electromotive force at the time of the initial driving of the motor apparatus 200 is reduced, a driving current I at the time of the initial driving approaches a maximum value. That is, at the time of the initial driving of the motor apparatus 200, the excessive driving current may be generated.

According to the embodiment of the present invention, the resistance value resistance may be variably changed to prevent excessive generation of the initial driving current I and stably drive the motor. That is, in the case in which the voltage Vd is constant, when the level of back-electromotive force according to the initial driving is low, the resistance value resistance may be increased to prevent the total driving current I from being excessively generated.

Hereinafter, the present invention will be described in more detail with reference to FIGS. 2 through 7. However, in a description of various embodiments of the present invention to be provided below, overlapped descriptions of contents the same as or corresponding to contents described above with reference to FIG. 1 will be omitted. However, those skilled in the art may clearly understand detailed contents of the present invention from the above-mentioned description.

Figure 2:
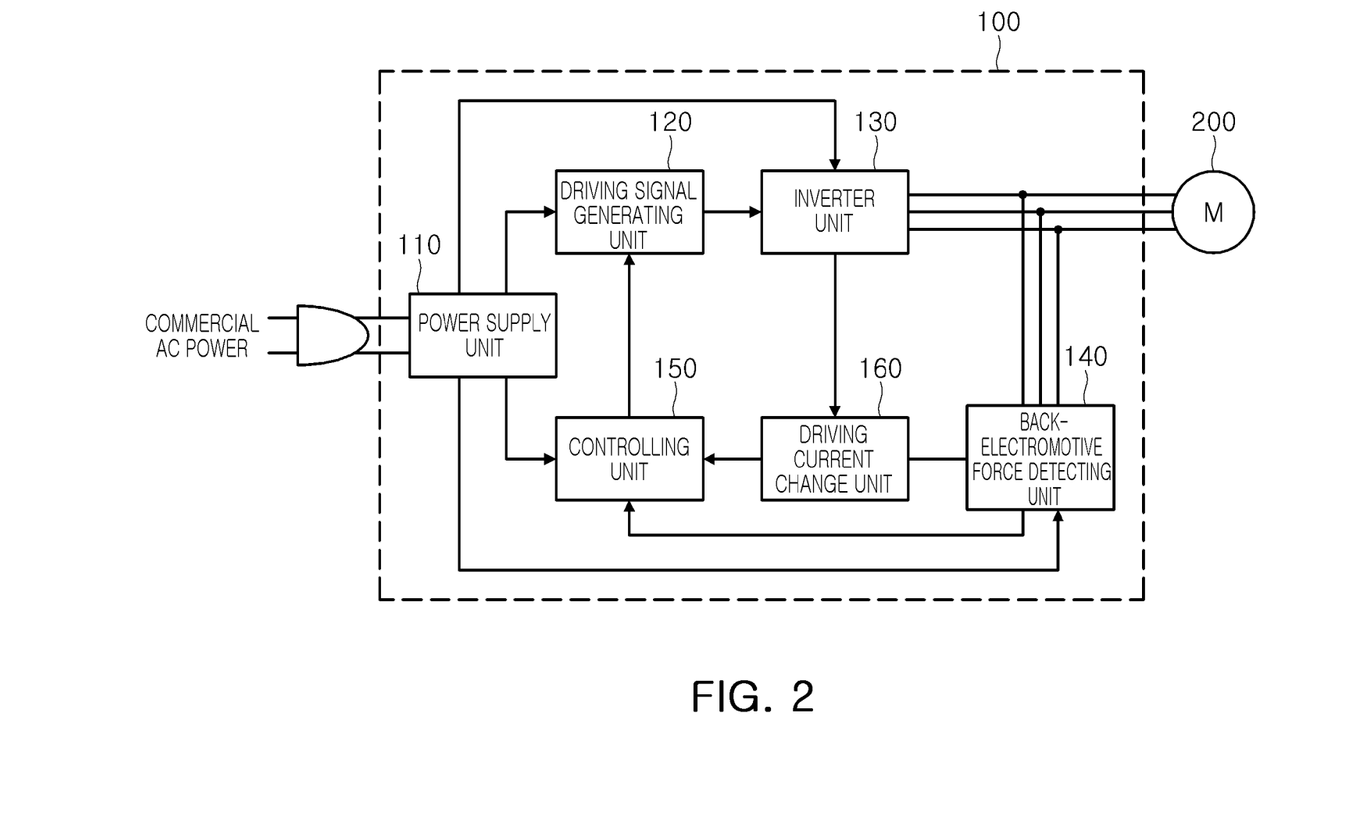
FIG. 2 is a configuration diagram illustrating an example of a motor driving control apparatus according to an embodiment of the present invention.

FIG. 2 is a configuration diagram illustrating an example of a motor driving control apparatus according to an embodiment of the present invention.

Referring to FIG. 2, the motor driving control apparatus 100 may include the power supply unit 110, the driving signal generating unit 120, the inverter unit 130, the back-electromotive force detecting unit 140, the controlling unit 150, and a driving current change unit 160.

The power supply unit 110 may supply power to respective components of the motor driving control apparatus 100.

The driving signal generating unit 120 may provide a driving control signal to the inverter unit 130. For example, the driving control signal may be a pulse width modulation (PWM) signal.

The inverter unit 130 may control an operation of the motor apparatus 200. For example, the inverter unit 130 may convert a driving voltage into a multi-phase (for example, a three-phase or a four-phase) voltage according to the driving control signal and apply the multi-phase voltage to respective coils (not shown) of the motor apparatus 200.

Since the inverter unit 130 provides the driving voltage to the motor apparatus 200, the inverter unit 130 may have a driving current. The driving current may be provided to the driving current change unit 160.

The back-electromotive force detecting unit 140 may detect back-electromotive force in the motor apparatus 200.

The back-electromotive force detecting unit 140 may provide the detected back-electromotive force to the driving current change unit 160, and the driving current change unit 160 may reflect the back-electromotive force to determine a resistance value.

In addition, the back-electromotive force detecting unit 140 may provide the detected back-electromotive force to the controlling unit 150, and the controlling unit 150 may determine a phase commutation point of the motor apparatus 200 using the back-electromotive force.

The controlling unit 150 may determine the phase commutation point of the motor apparatus 200 using the back-electromotive force and reflect the determined phase commutation point to control the driving signal generating unit 120 to generate the driving control signal.

In the embodiment of the present invention, the controlling unit 150 may further reflect a driving current corrected by the driving current change unit 160 to control the driving of the motor apparatus 200. More specifically, the controlling unit 150 may perform a control operation to adjust a duty ratio of the driving control signal provided to the inverter unit 130 according to the driving current in which the resistance value is reflected by the driving current change unit 160. For example, the controlling unit 150 may perform a control operation to decrease the duty ratio of the driving control signal when it is determined that an initial driving current is excessive.

The driving current change unit 160 may variably change the resistance value according to a level of back-electromotive force to prevent excessive generation of an initial driving current. That is, as described above with reference to Equation 1, the driving current change unit 160 may reflect the level of back-electromotive force to determine the resistance value of a variable resistor and reflect this resistance component in the driving current. The driving current change unit 160 will be described below in more detail with reference to FIG. 3.

The motor apparatus 200 may perform a rotation operation according to the driving control signal. For example, the motor apparatus 200 may generate magnetic fields in the respective coils (stators) of the motor apparatus 200 by currents provided from the inverter unit 130 and flowing in the respective phases. The rotor (not shown) included in the motor apparatus 200 may be rotated by the magnetic fields generated in the respective coils as described above.

Figure 3:
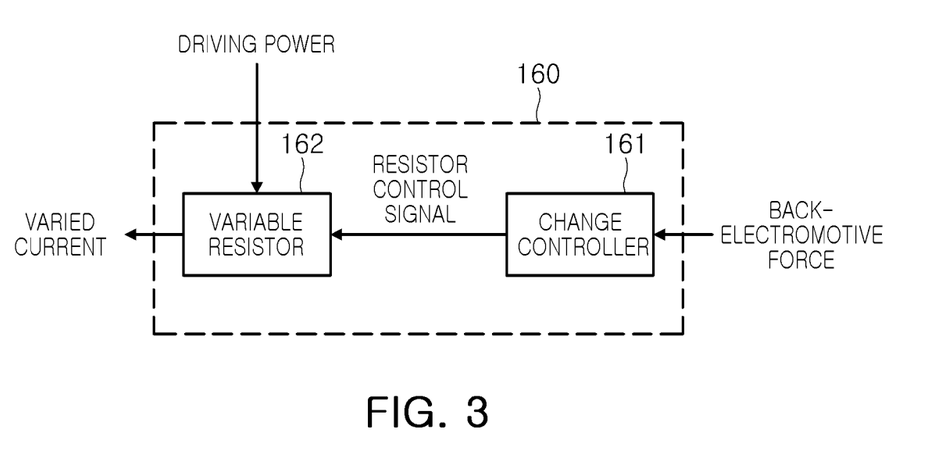
FIG. 3 is a partial configuration diagram illustrating an example of a driving current change unit of FIG. 2.

FIG. 3 is a partial configuration diagram illustrating an example of the driving current change unit of FIG. 2.

Referring to FIG. 3, the driving current change unit 160 may receive the back-electromotive force and the driving current and add a predetermined resistance component to the driving current to output a varied current (driving current).

More specifically, the driving current change unit 160 may include a change controller 161 and a variable resistor 162.

The change controller 161 may receive the back-electromotive force and determine a resistance value to be reflected in the driving current. That is, the change controller 161 may receive the back-electromotive force from the back-electromotive force detecting unit 140 and determine the resistance value so as to be in inverse proportion to the level of back-electromotive force.

In the embodiment of the present invention, the change controller 161 may determine the resistance value using information on a resistance value corresponding to a range of levels of the back-electromotive force. That is, the change controller 161 may prestore information on a plurality of predetermined differential resistance values according to the range of levels of the back-electromotive force and determine the resistance value corresponding to the range of levels of the back-electromotive force input from the back-electromotive force detecting unit 140.

The change controller 161 may reflect the determined resistance value to generate a resistor control signal, provide the resistor control signal to the variable resistor 162, and perform a control operation to change the resistance value.

The variable resistor 162 may include variable resistors and change a resistance value of the variable resistor according to the resistor control signal provided from the change controller 161. The variable resistor 161 may reflect the changed resistance value in the driving current.

In the embodiment of the present invention, the variable resistor 162 may vary the resistance value using a plurality of resistors connected to one another in series. More specifically, the variable resistor 162 may include the plurality of resistors connected to one another in series and may be operated to switch at least a portion of the plurality of resistors that are connected to one another in series according to the control signal from the change controller 161 to have the above-mentioned resistance value.

Hereinafter, the motor driving control apparatus 100 will be described in more detail using a circuit configuration diagram according to an example of the driving current change unit 160.

Figure 4:
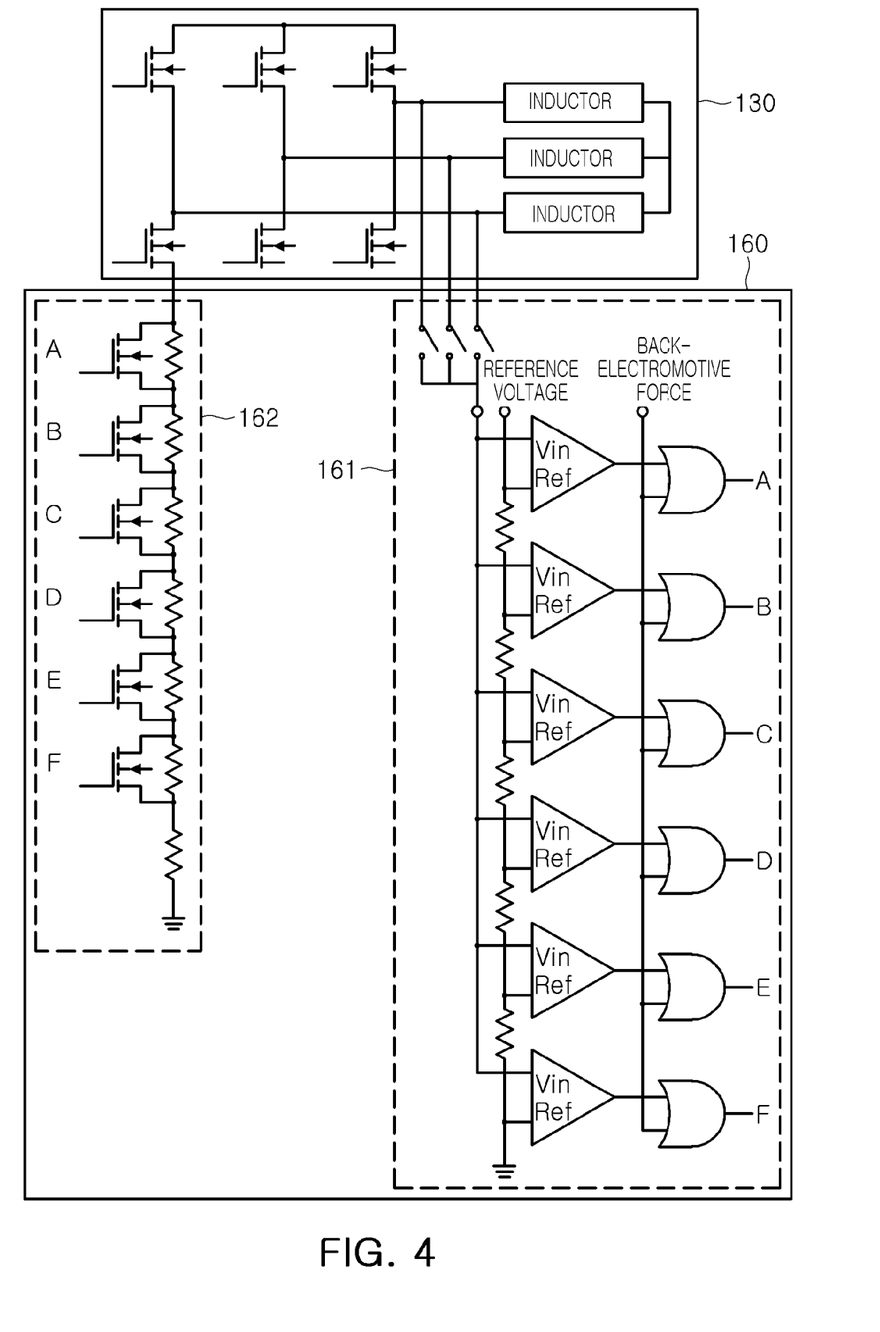
FIG. 4 is a partial circuit diagram illustrating an example of a motor driving control apparatus including a driving current change unit.

FIG. 4 is a partial circuit diagram showing an example of a motor driving control apparatus including a driving current change unit.

The driving current change unit 160 shown in the embodiment of FIG. 4 relates to a ladder resistor structure, but is only illustrative. Therefore, the driving current change unit 160 may also be configured using a variable resistor structure capable of having a variable resistance value other than the ladder resistor structure.

Referring to FIG. 4, the driving current change unit 160 may include the change controller 161 and the variable resistor 162.

The driving current change unit 160 may open/close at least a portion of the plurality of resistors at the time of the initial driving of the motor apparatus to reflect the resistance value determined according to the back-electromotive force in the driving current.

The driving current change unit 160 may include the ladder resistor structure. More specifically, the driving current change unit 160 may include the variable resistor 162 having the ladder resistor structure. The variable resistor 162 may include a plurality of resistors connected to one another in series and a plurality of switches connected to the plurality of series-connected resistors in parallel, respectively, to thereby be configured to have a ladder structure.

The variable resistor 162 may receive a resistor control signal from the change controller 161 to perform a switching operation of the ladder resistors.

The change controller 161 may generate the resistor control signal using the back-electromotive force. As described above, since the level of back-electromotive force is small at the time of the initial driving of the motor apparatus 200, when the back-electromotive force has a value corresponding to the initial driving, the change controller 161 may generate the resistor control signal so that a total resistance value of the variable resistor 162 rises to a maximum value.

Describing this in more detail with reference to the example shown in FIG. 4, the change controller 161 may compare a magnitude of a phase voltage with that of a reference voltage using a comparator. As shown in FIG. 4, the number of comparators may correspond to that of ladder resistors. In addition, it may be appreciated that reference voltages of a plurality of comparators are set to be different in a stepwise manner. An OR gate may receive a back-electromotive force signal, and the back-electromotive force signal may be represented by any one of an ON value and an OFF value. That is, in the case in which it is determined that back-electromotive force is sufficiently large and it does not correspond to initial driving, the back-electromotive force signal may be input as the ON value. In this case, all OR gates may output 1. Therefore, the change controller 161 may provide (1, 1, 1, 1, 1, 1) to the variable resistor 162, and the variable resistor 162 may switch all the switches to be in an ON state, accordingly to set the resistance value as 0.

The change controller 161 may perform a control operation so that the total resistance value of the variable resistor 162 is gradually decreased as the back-electromotive force is gradually increased. In the example shown in FIG. 4, the change controller may generate the resistor control signal using six parallel elements A to F. Therefore, the resistor control signal may be represented by a set of six signals and be provided to each of the ladder resistors connected to one another in series in the variable resistor 162 to thereby be used to determine the resistance value.

For example, when all resistance values included in A to F are intended to be applied at the time of initial driving, the change controller 161 may provide a signal of (0, 0, 0, 0, 0, 0) to the variable resistor 162, and the variable resistor 162 may switch all the switches to be in an OFF state, since values of all the switches are 0. As a result, six resistors included in the variable resistor 162 are connected to one another in series, such that the resistance value of the variable resistor 162 may become a maximum value.

Since the change controller 161 may have variable resistance values according to the range of levels of the back-electromotive force in advance, when the back-electromotive force is increased according to the driving of the motor apparatus 200, the change controller 161 may regenerate the resistor control signal to allow the variable resistor 162 to have the variable resistance value corresponding to the increased back-electromotive force and provide the regenerated resistor control signal to the variable resistor 162.

Figure 5:
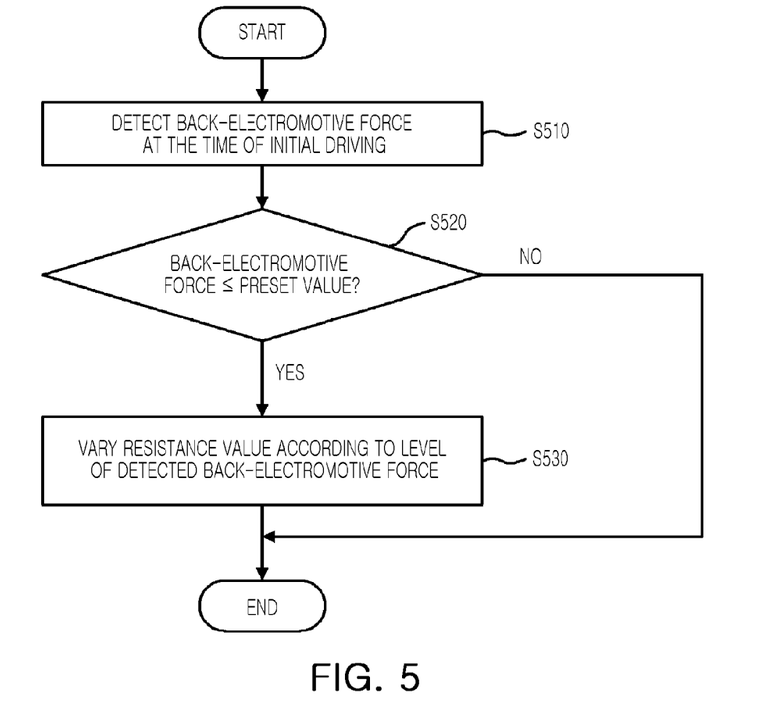
FIG. 5 is a flowchart illustrating an example of a motor driving control method according to an embodiment of the present invention.

FIG. 5 is a flowchart illustrating an example of a motor driving control method according to an embodiment of the present invention.

Hereinafter, a motor driving control method according to the embodiment of the present invention will be described with reference to FIG. 5. Since the motor driving control method according to the embodiment of the present invention is performed in the motor driving control apparatus 100 described above with reference to FIGS. 2 through 4, a description of contents overlapped with the above-mentioned contents will be omitted.

Referring to FIG. 5, the motor driving control apparatus 100 may detect back-electromotive force generated at the time of initial driving of the motor apparatus 200 (S510). Here, initial driving may be driving in a predetermined period of time after a driving control signal is given in a stopped state.

The motor driving control apparatus 100 may compare a level of the detected back-electromotive force with a preset value (S520) and determine a resistance value that is in inverse proportion to the level of the back-electromotive force when the level of the back-electromotive force is equal to or less than the preset value. That is, as described above with reference to Equation 1, since a value of a driving current is increased as the level of the back-electromotive force is decreased, the resistance value may be increased in order to constantly maintain the value of the driving current.

The motor driving control apparatus 100 may reflect the determined resistance value in the driving current of the motor apparatus 200 to thereby limit an increase in the driving current at the time of initial driving (S530).

In the embodiment of the present invention, the motor driving control apparatus 100 may prestore information on the range of levels of the back-electromotive force and the resistance value and determine the resistance value using the information. Here, the level of the back-electromotive force may be classified by ranges, and the resistance value may be classified by predetermined values. This is to easily apply the back-electromotive force and the resistance value to the example in which the variable resistor is configured to have the ladder resistor structure as in the example described above with reference to FIG. 4.

In the embodiment of the present invention, when the resistance value is determined, the motor driving control apparatus 100 may generate a resistor control signal corresponding to the determined resistance value. Here, the resistor control signal maybe implemented as a switching signal for each switch of the ladder resistor structure so as to switch at least a portion of the plurality of resistors connected to one another in series.

In the embodiment of the present invention, the motor driving control apparatus 100 may switch the ladder resistor according to the resistor control signal to reflect a resistance component in the driving current.

Figure 6:
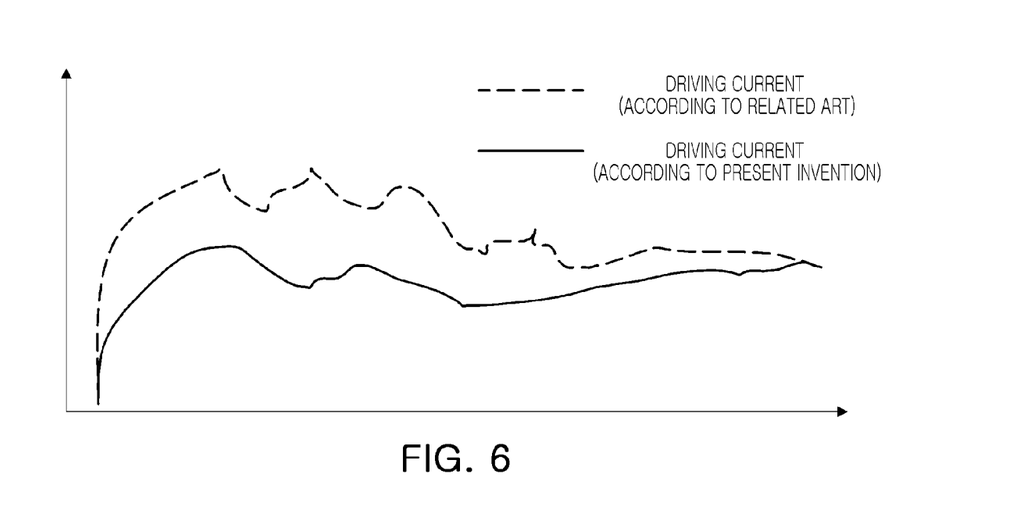
FIG. 6 is a reference graph showing a change in driving current according to an embodiment of the present invention.

FIG. 6 is a reference graph showing a change in driving current according to an embodiment of the present invention.

In FIG. 6, a dotted line refers to a driving current of a motor apparatus according to the related art, and a solid line refers to a driving current of a motor apparatus according to the embodiment of the present invention.

It may be appreciated as illustrated in FIG. 6 that the driving current of the motor apparatus according to the embodiment of the present invention is clearly lower than that of the motor apparatus according to the related art at the time of initial driving of the motor apparatus.

It may be appreciated that the present invention has the same feature as that of the related art in that the driving current converges in a predetermined value as the motor apparatus is continuously driven; however, the present invention is more effective than the related art in an initial driving process. That is, it may be appreciated that the initial driving current may be generated in a range similar to a current value in the case in which the motor apparatus is continuously driven in the embodiment of the present invention.

Due to these features, it may be appreciated that the motor may be stably driven in the embodiment of the present invention.

As set forth above, according to embodiments of the present invention, a variable resistance component is reflected in driving current according to a range of back-electromotive force, whereby excessive driving current at the time of initial driving may be compensated for.

While the present invention has been shown and described in connection with the embodiments, it will be apparent to those skilled in the art that modifications and variations can be made without departing from the spirit and scope of the invention as defined by the appended claims.

What is claimed is:

1. A motor driving control apparatus comprising:
    an inverter unit applying a driving current to a motor apparatus according to a driving control signal;
    a back-electromotive force detecting unit detecting back-electromotive force generated by driving of the motor apparatus;
    a driving current change unit determining a resistance value in inverse proportion to a level of back-electromotive force and adjusting the driving current with reference to the resistance value, wherein the driving current change unit includes a plurality of resistors connected to one another in series and opens/closes at least a portion of the plurality of resistors to reflect the resistance value in the driving current; and
    a controlling unit performing a control operation to change the driving control signal using the driving current in which the resistance value is reflected and the back-electromotive force.

2. The motor driving control apparatus of claim 1, wherein the plurality of resistors connected to one another in series are configured in a ladder structure, in which the plurality of resistors are connected to a plurality of switches in parallel, respectively.

3. The motor driving control apparatus of claim 1, wherein the driving current change unit includes a change controller receiving the back-electromotive force from the back-electromotive force detecting unit and determining the resistance value to be in inverse proportion to the level of the back-electromotive force.

4. The motor driving control apparatus of claim 3, wherein the driving current change unit further includes a variable resistor including a plurality of resistors connected to one another in series and operated to switch at least a portion of the plurality of resistors connected to one another in series according to a control signal of the change controller to have the resistance value.

5. The motor driving control apparatus of claim 1, wherein the driving current change unit pre-stores information on a plurality of predetermined differential resistance values according to a range of levels of the back-electromotive force and determines a resistance value corresponding to the range of levels of the back-electromotive force input from the back-electromotive force detecting unit using the information.

6. The motor driving control apparatus of claim 1, wherein the controlling unit adjusts a duty ratio of the driving control signal provided to the inverter unit according to the driving current in which the resistance value is reflected.

7. The motor driving control apparatus of claim 1, wherein the controlling unit controls the driving signal generating unit to perform phase commutation at a zero-crossing point of the back-electromotive force.

8. The motor driving control apparatus of claim 1, wherein the controlling unit determines a phase commutation point of the motor apparatus using the back-electromotive force and controls generation of the driving control signal using the determined phase commutation point.

9. A motor comprising:
    a motor apparatus including a plurality of coils; and
    a motor driving control apparatus controlling current provided to the plurality of coils to control driving of the motor apparatus,
    wherein the motor driving control apparatus includes:
        an inverter unit applying a driving current to the motor apparatus according to a driving control signal;
        a back-electromotive force detecting unit detecting back-electromotive force generated by the driving of the motor apparatus;
        a driving current change unit determining a resistance value in inverse proportion to a level of back-electromotive force and adjusting the driving current with reference to the resistance value, wherein the driving current change unit includes a plurality of resistors connected to one another in series and opens/closes at least a portion of the plurality of resistors to reflect the resistance value in the driving current; and a controlling unit performing a control operation to change the driving control signal using the driving current in which the resistance value is reflected and the back-electromotive force.

10. A motor driving control method performed by a motor driving control apparatus controlling driving of a motor apparatus, the motor driving control method comprising:

detecting back-electromotive force generated by initial driving of the motor apparatus;

comparing a level of the back-electromotive force with a preset value and determining a resistance value in inverse proportion to the level of the back-electromotive force when the level of the back-electromotive force is equal to or less than the preset value; and reflecting the resistance value in the driving current of the motor apparatus and limiting an increase in the driving current at the time of the initial driving of the motor apparatus.

11. The motor driving control method of claim 10, wherein the determining of the resistance value includes storing information on the resistance value preset according to a range of levels of the back-electromotive force.

12. The motor driving control method of claim 10, wherein the motor driving control apparatus includes a variable resistor having a ladder structure in which a plurality of resistors connected to each other in series are connected in parallel to a plurality of switches, respectively.

13. The motor driving control method of claim 12, wherein the determining of the resistance value includes generating a resistor control signal for switching at least a portion of the plurality of resistors connected to each other in series to correspond to the resistance value.

14. The motor driving control method of claim 13, wherein the limiting of the increase in the driving current includes switching at least a portion of the plurality of resistors connected to each other in series according to the resistor control signal to reflect the resistance value in the driving current.

* * * * *